Sept. 9, 1969  C. K. WOODMAN  3,465,711
ADHESIVE-APPLYING APPARATUS
Filed June 22, 1967  3 Sheets-Sheet 1
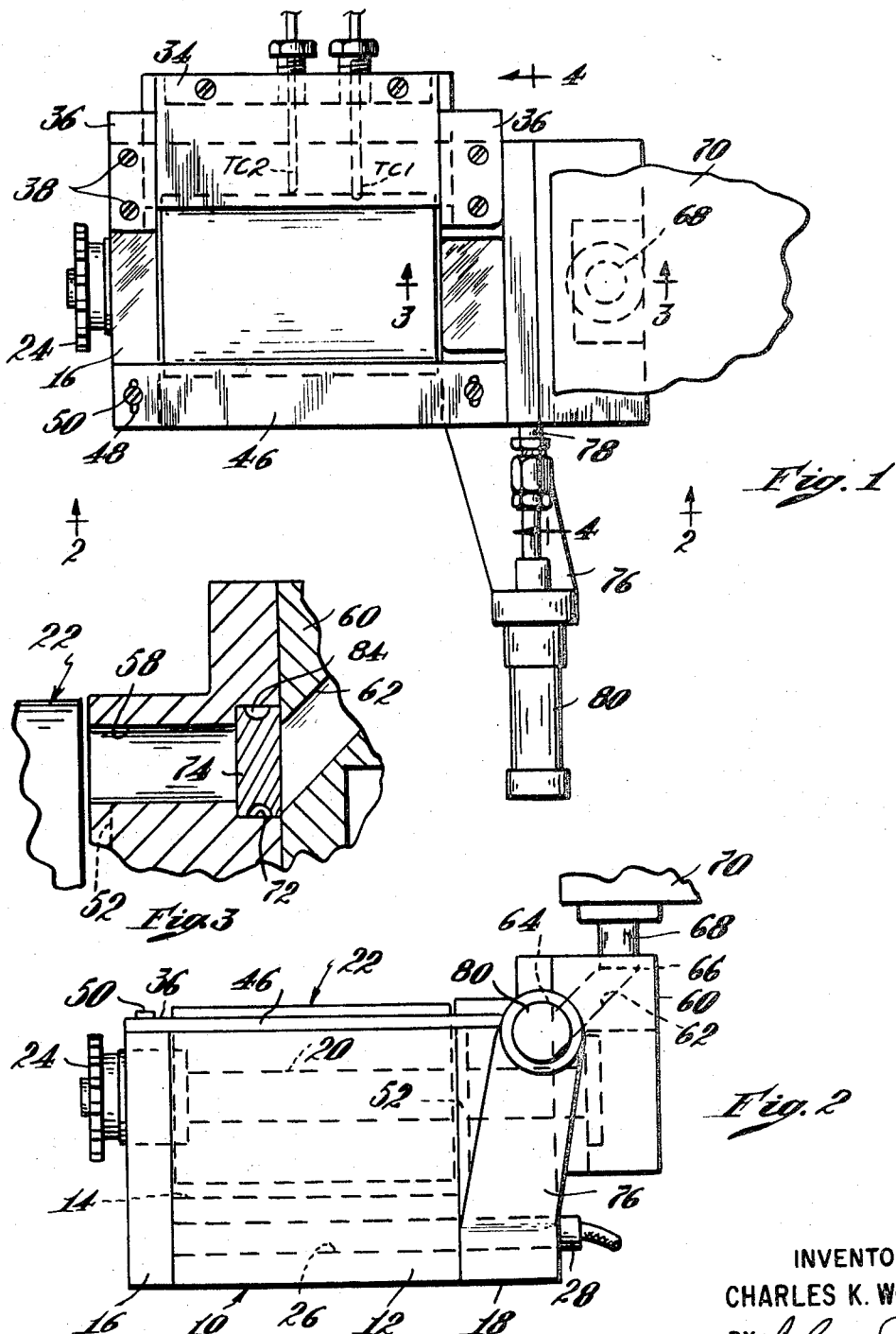
INVENTOR
CHARLES K. WOODMAN
BY
ATTORNEY

INVENTOR
CHARLES K. WOODMAN
BY
ATTORNEY

INVENTOR
CHARLES K. WOODMAN
BY
ATTORNEY

United States Patent Office 3,465,711
Patented Sept. 9, 1969

3,465,711
ADHESIVE-APPLYING APPARATUS
Charles K. Woodman, Waltham, Mass., assignor to Campo Industries, Inc., Waltham, Mass.
Filed June 22, 1967, Ser. No. 648,148
Int. Cl. B05c 1/08, 11/04
U.S. Cl. 118—5     6 Claims

ABSTRACT OF THE DISCLOSURE

Apparatus for applying hot melt adhesive to worklayer of adhesive and for giving up adhesive to a workpiece moved over its surface, and a doctor blade for controlling the thickness of the adhesive. The doctor blade forms an angle with the upwardly moving surface of the roll into which the adhesive is supplied by gravity or by a pump and from which adhesive is carried upwardly between the surface of the roll and the edge of the doctor blade. Sensing devices are provided, one of which senses the presence or absence of the adhesive in the angle, and in the absence of adhesive effects operation of a valve or a pump to add adhesive thereto, and the other of which is operative to maintain the roll at an optimum temperature.

Background of the invention

The use of an applicator roll and a doctor for applying a uniformly thick layer of adhesive to workpieces is old in the art and where used the adhesive is supplied to the surface of the roll from a container or pot in which it is supported with its lower portion in the pot. Optionally a transfer roll is supported in the pot with its lower portion submerged in the adhesive and its upper portion in contact with the applicator roll. The chief difficulty with this kind of apparatus is that a relatively large amount of adhesive must be kept melted and prolonged exposure of a large amount of molten adhesive tends to reduce its bonding strength. Accordingly, it is the principal object of this invention to overcome this disadvantage inherent in known apparatus by limiting the amount of molten liquid adhesive exposed to the atmosphere substantially to the amount that is used up at any given time, and to eliminate the conventional pot containing a body of molten adhesive constantly agitated and exposed to the atmosphere by one or more transfer rolls.

Summary

As herein illustrated, the apparatus comprises an applicator roll having a peripheral surface, a doctor blade supported with an edge in spaced parallel relation thereto at the upwardly moving side and with the surface toward which the roll is turning making an angle therewith, said roll being adapted by its rotation toward the doctor blade to support a body of adhesive in said angle, means for supplying added adhesive to the angle as it is used up, and a sensing device supported in said angle at a predetermined distance from the surface of the roll for contact with the body of adhesive in the angle, said sensing device being operative in the absence of adhesive at said predetermined distance to effect operation of said means for supplying adhesive to the angle.

Figure 4:
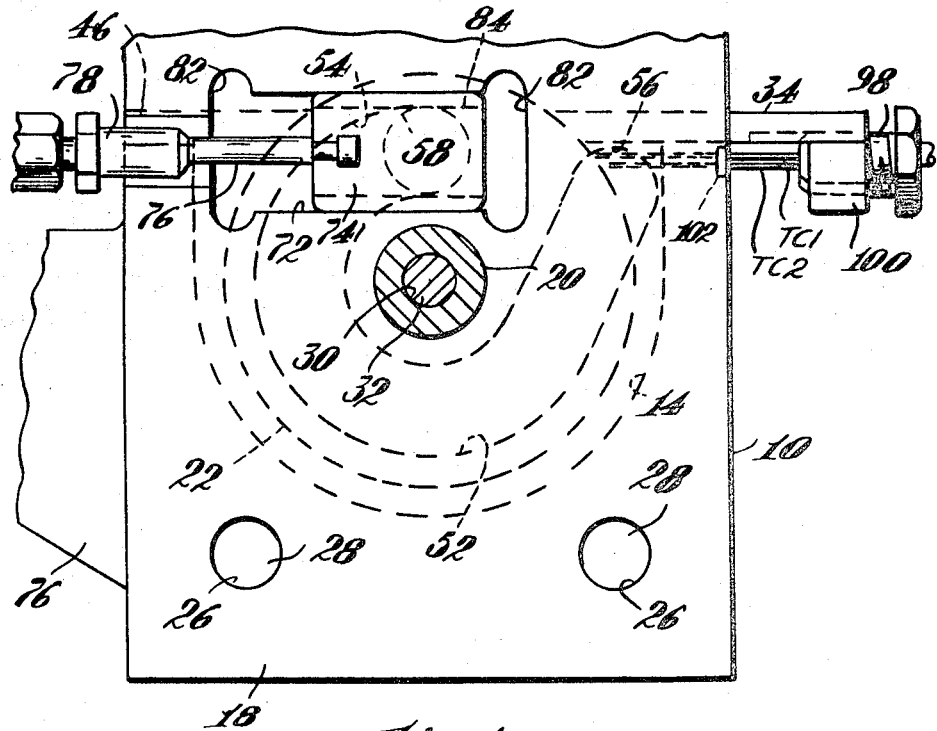
Figure 5:
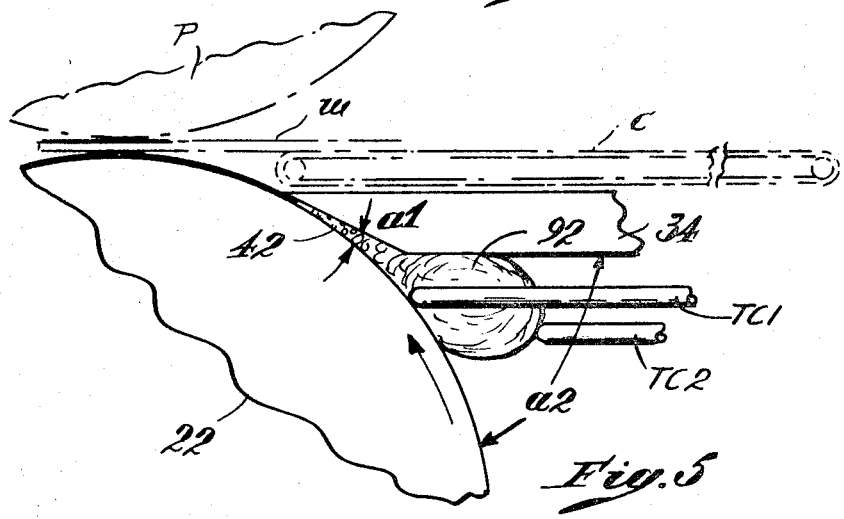
Figure 6:
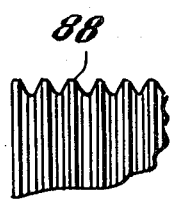
Figure 7:
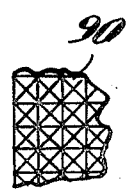
Figure 8:
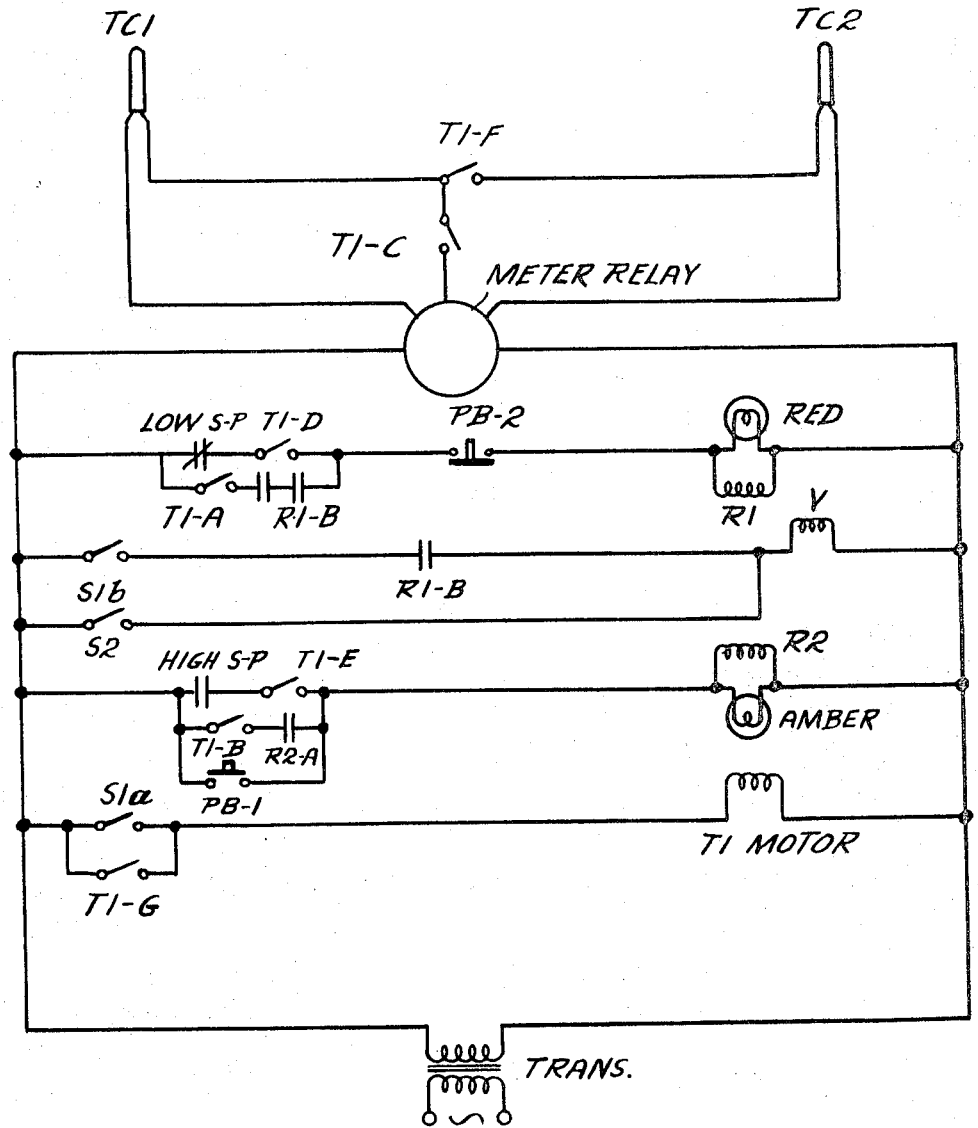

The invention will now be described in greater detail with reference to the accompanying drawings wherein:

FIG. 1 is a plan view of the applicator;
FIG. 2 is an elevation looking in the direction of the arrows 2—2 of FIG. 1;
FIG. 3 is a fragmentary vertical section taken on the line 3—3 of FIG. 1;
FIG. 4 is a side view in elevation taken on the line 4—4 of FIG. 1;
FIG. 5 is a fragmentary elevation, to much larger scale, showing a portion of the applicator roll, a doctor blade, a bead of adhesive supported between the surface of the applicator roll and doctor blade, and two sensing devices;
FIG. 6 is a fragmentary portion of an applicator roll having a groove surface;
FIG. 7 is a fragmentary portion of an applicator roll having a knurled surface; and
FIG. 8 is a wiring diagram showing the sensing devices by means of which the applicator roll is maintained at the proper temperature and the desired amount of adhesive is maintained in the angle between the applicator roll and the doctor blade.

Referring to the drawings, the applicator 10 comprises a block 12 containing a recess 14 which extends transversely through it from end to end, the ends being closed by plates 16 and 18 bolted to the block 12. The plates 16 and 18 provide bearings in which there is rotatably mounted a shaft 20, the axis of which is horizontal and concentric with the recess 14 and on this shaft there is fixed an applicator roll 22, the lower portion of which rotates within the recess and the upper portion of which projects slightly above the top of the block 12. The shaft 20 has on it a sprocket 24 by means of which it may be rotated. The motor for driving the applicator roll is not shown.

The block 12 contains below the recess spaced parallel holes 26 which extend transversely thereof in which are mounted heating elements 28 and the shaft 20 contains an axial, longitudinally extending hole 30 in which there is mounted a heating element 32. The heating elements in the block and the shaft provide for maintaining the block and the applicator roll at a temperature such as to keep the adhesive molten.

At the top of the block 12 and at the upgoing side of the roll 22 (FIGS. 4 and 5) there is a doctor blade 34 mounted between transversely spaced gibs 36 (FIGS. 1 and 2) secured to the upper edges of the plates 16 and 18 by bolts 38, so that it may be adjusted toward and away from the applicator roll 22. The forward end 40 of the doctor blade is beveled to provide a downwardly and rearwardly inclined face 42. The blade 34 is substantially horizontal and the face 42 and the underside 44 of the blade are situated, respectively, at angles $a1$ and $a2$, which are acute with reference to the upwardly moving surface of the applicator roll. At the opposite side of the block there is a plate 46 provided at its ends with slots 48 (FIG. 1) which is secured to the plates 16 and 18 by bolts 50, so that it may be adjusted relative to the applicator roll. The plate 46 is not a doctor blade, its purpose being solely to prevent dirt and other foreign matter from dropping or falling into the recess 14.

The plate 18 has on its inner face, that is the face confronting the recess 14, a groove 52, one end 54 of which is located above the shaft 20 and the other end 56 of which is located adjacent the underside of the doctor blade 34. The portion of the groove 52 between the ends 54 and 56 extends forwardly from the upper end 54 around the shaft 20 in the direction of rotation to the end 56 and is concentric with the axis of the shaft. At the end 54 of the groove 52 there is a lateral passage 58 (FIGS. 2 and 3). A block 60 is bolted to the side of the plate 18 and this contains an inclined passage 62, the lower end 64 of which opens into the lateral passage 58 and the upper end 66 of which is in communication with the lower end 68 of a conductor extending downwardly from a cement pot 70 in which there is a supply of molten adhesive.

In the plate 18 there is a valve chamber 72 (FIG. 4) in which there is slidably mounted a valve block 74 connected to one end of a rod 76. The rod 76 extends from the block through a gland 78 into a cylinder 80 (FIG. 1), being connected therein to a piston (not shown). The piston is operable by supplying air to one end of the cylinder to effect movement of the valve block 74 within the chamber to withdraw it to a position uncovering the inclined passage 62 so as to permit adhesive to flow into the valve chamber. Supplying air to cylinder 80 thus allows the adhesive to flow into the chamber through the lateral passage 58 and hence into the groove 52. The coil V in the wiring diagram controls admission of pressure to the opposite ends of the cylinder 80, by means of which the valve block 74 is moved in the valve chamber. The valve chamber has at its ends annular grooves 82 and the valve block contains longitudinally extending grooves 84 to permit the surplus adhesive to flow to the rear side of the valve block as the latter moves forwardly and when the valve block is moved rearwardly to permit the surplus adhesive to flow forwardly therein without building up excessive pressure in the valve chamber.

As thus designed, in operation as the applicator roll is rotated in the recess 14 the end face of the roll confronting the groove 52 will carry the adhesive around the axis of the shaft in the direction of rotation from the place where the adhesive enters the groove at the top 54 to the end 56 which is adjacent the underside of the doctor blade where it is permitted to move onto the peripheral surface of the applicator roll. The lower surface of the doctor blade blocks free flow of the adhesive as it moves upwardly into engagement with its underside and as a result the adhesive accumulates in the angle between the lower surface of the blade and the roll and gradually travels laterally from the end where it is delivered to the surface to the opposite end. As shown in FIG. 5, the surface of the applicator roll, as indicated at 86, is smooth. However it may be provided with grooves 88 (FIG. 6) or knurling 90 (FIG. 7).

One of the important aspects of the invention as related above is to maintain the amount of molten adhesive exposed to the moving parts and to the applicator at a minimum and this is achieved herein by delivering the adhesive as just described to the angle between the doctor blade and the upper surface of the roll at the upgoing side of the roll and confining it to the angle between the lower side of the doctor blade and the surface of the applicator roll, to wit, the angle $a2$. The adhesive has a considerable amount of surface tension while in its molten condition and so it is possible by controlling the temperature of the adhesive and the applicator roll and by rotating the applicator roll at a suitable rate to maintain within the angle an elongate bead 92 of adhesive which gives up a sufficient amount of adhesive to the applicator roll as the latter rotates to keep the surface of the applicator roll coated with a layer of adhesive corresponding in thickness to the spacing between the surface of the applicator roll and the end 40 of the doctor blade. The bead 92, indicated by the broken lines (FIG. 5) rotates slowly in the angle in a direction opposite to the direction of rotation of the applicator roll and is somewhat elliptical in cross-section. Depending upon the conditions the adhesive forwardly of the bead, that is, in the angle $a1$ may be in the form of one or more smaller beads. The size of the bead and its replenishment is provided for by a sensing device TC2 (FIGS. 5 and 8) which is mounted at the underside of the doctor blade is spaced relation to the surface of the applicator roll, so that its forward end just touches the surface of the adhesive forming the bead. The sensing device TC2 is preferably but not necessarily responsive to a temperature change and controls operation of the valve block 74 by supplying air pressure to the cylinder 80 to open or close the valve 74. As adhesive is used up so that the bead no longer has contact with the sensing device TC2, the latter will, due to a drop in temperature, effect operation of the cylinder 80 and hence the valve 74 to allow an additional amount of adhesive to flow into the groove 52. As soon as recontact is made, the valve is closed.

It is necessary to keep the applicator roll at a suitable temperature for maintaining the adhesive at an optimum temperature and accordingly there is a second sensing device TC1 which is closely adjacent the surface of the applicator roll. The sensing device TC1 is temperature-responsive and whenever the temperature of the applicator roll falls below a predetermined level, it actuates the heating element 32 in the roll to raise the temperature to the desired level. Both of the sensing devices are mounted so as to be adjustable relative to the surface of the roll in sleeves 98 which are threaded into a block 100 secured to the lower side of the doctor blade 34. The sensing devices extend through glands 102 in the wall of the block. The heating elements 28 are controlled by independent thermostats.

FIG. 8 illustrates the wiring circuit wherein there is a meter relay to which the temperature-sensing devices TC1 and TC2 are connected in a circuit containing a switch provided with contacts T1–C and T1–F. The meter is provided with a scale and a pointer movable along the scale to indicate the temperature at any given time. The contacts T1–C and T1–F are periodically opened and closed every 12 seconds by a timer driven by a timing motor T1. Each time the contact T1–C is closed the device TC2 is disconnected from the circuit; consequently the meter will indicate the temperature of the device TC1. When the contact T1–C is opened and the contact T1–F is closed, the meter indicates a function of the difference in temperature between TC1 and TC2. The meter is preset to a high point of, for example, 115° F. and a low point of 105°. The sensing devices TC1 and TC2 are thermocouples and the located, respectively, a few thousandths of an inch from the surface of the applicator roll and approximately one-quarter inch.

The circuit is supplied with current through a transformer, so identified. In the circuit there are two relays R1 and R2. Relay R1, when energized, provides for supplying adhesive to the applicator roll and relay R2, when energized, provides for supplying heat to the applicator roll. In this circuit there are switches marked S1$a$, S1$b$ and S2. The machine is started by closing each of the switches S1$a$, S1$b$ and S2. At this stage the applicator roll is cold and there is no adhesive in the angle between the applicator roll and the doctor blade. Hence both the sensing devices TC1 and TC2 are unsatisfied. So long as the sensing device TC1 is unsatisfied it holds the high set point contacts closed so that relay R2 is energized through switch T1–E which is closed by the timer T1. When the relay R2 is energized it closes contacts R2–A to provide a holding circuit.

So long as the sensing device TC2 is not satisfied, the low set contact remains closed thus energizing relay R1 through the contact T1–B which is closed by the aforesaid timer T1. Energizing relay R1 closes contact R1B–$a$ which provides a holding circuit for relay R1 and R1B–$b$ which energizes the coil V of the valve for supplying adhesive to the applicator roll. When TC1 is satisfied relay R2 will be de-energized and when TC2 is satisfied relay R1 will be de-energized.

The switch S1$a$ when closed starts the timing motor T1 and the motor circuit is held closed by the switch T1–G for one complete cycle of operation. The timer motor also provides for moving the contacts T1–C and T1–F alternately into and out of operation once every 12 seconds, so that the system operates alternately to indicate the temperature of the sensing device TC1 (high set point) and then to indicate the difference in temperature between TC1 and TC2 (low set point). To provide for this when the contact T1–F is closed, which de-energizes relay R2 and opens contact R2–A, contact T1–E is closed by the timer so as to re-energize relay R2 through the high set point contact which is still closed because of the fact that TC1 is unsatisfied. Correspondingly, if the contact T1–C is closed so that relay R1 is de-energized and contacts R1B–$a$ and R1B–$b$ are opened, there is provided a switch T1–B which is closed by the timer T1 to re-energize relay R1 through the normally closed low set point contact as long as the latter is maintained closed by the unsatisfied condition of TC2.

A push button switch PB2 is provided for shutting down by preventing supply of adhesive to the applicator roll. A push-button switch PB1 is provided for warming up the applicator roll prior to starting the timing motor if this is found desirable.

In operation of the apparatus the control circuit is energized by closing the main switch and after the adhesive becomes molten and a bead is formed in the angle between the surface of the roll and the doctor blade of such proportion as to provide a uniform film of adhesive on the surface of the applicator roll, workpieces to which adhesive is to be applied are advanced across the top of the applicator roll, for example, by means of a pressure roll P mounted above the roll 22 as shown in dotted lines (FIG. 5). Optionally a conveyor C, also shown in dotted lines (FIG. 5) may be employed to feed the workpiece to the nip of the applicator roll 22 and pressure roll P. The thickness of the adhesive on the surface of the applicator roll and hence the thickness which is applied to the workpiece may be adjusted by the doctor blade relative to the surface of the roll. As the adhesive is transferred to the workpiece from the applicator roll and the partially denuded surface of the roll moves around to the underside of the doctor blade, it picks up a new supply of adhesive from the bead thus depleting the amount of adhesive in the bead. Depletion of the bead is, of course, sensed by the sensing device TC2 and when the bead no longer has contact with the sensing device the circuit will actuate the cylinder 80 to move the valve 74 in a direction to allow additional adhesive to flow into the groove 52. The sensing device TC1, as previously pointed out, it for the purpose of maintaining the roll at an optimum temperature.

During operation of the apparatus the adhesive is sustained by the upwardly moving surface of the applicator roll in the angles a1, a2 between this surface and the underside of the doctor blade so that only a small amount of adhesive is present in the recess 14, not enough so that the surface of the applicator roll picks up from the recess. Hence there is no substantial amount of molten adhesive exposed to oxidation and no substantial amount of surplus adhesive will remain to solidify when the apparatus is not in use and so require prolonged heating to restore the apparatus to operation and/or to require chipping out the unmeltable adhesive to effect cleaning and restoration of the apparatus to operation.

I claim:

1. An applicator comprising an applicator roll, a doctor blade supported lengthwise of the applicator roll parallel to its surface and forming therewith a distal angle at the underside of the doctor blade, means for heating the applicator roll, means for depositing in said angle a body of molten adhesive, and sensing devices, one adjacent the surface of the applicator roll and the other spaced therefrom adjacent the surface of the body, said one sensing device sensing the temperature of the applicator roll and the other the temperature of the body, means responsive to one sensing device to maintain the applicator roll at an optimum temperature, and means responsive to the other to effect operation of the means for depositing additional adhesive in said angle as the body is used up.

2. An applicator comprising a roll having a peripheral surface, a doctor blade supported with an edge in spaced parallel relation thereto at the upwardly moving side and with the surface of the doctor blade toward which the roll is turning making an angle therewith, said roll being adapted by its rotation toward the doctor blade to support a body of adhesive exclusively in said angle, adhesive-feeding means operable to add adhesive to said angle as adhesive is used up, said adhesive-feeding means comprising a source of adhesive and a valve, and an adhesive sensing device supported in said angle at a predetermined distance from the surface of the roll, said adhesive sensing device being operable by contact of the adhesive therewith to close the valve and by subsidence of the adhesive therefrom to open the valve.

3. An applicator comprising a roll having an exterior peripheral surface and interiorly thereof a heating element, a doctor blade supported with an edge in spaced parallel relation to the upwardly moving surface of the roll with the surface of the doctor blade toward which the roll is turning making an acute angle therewith, said roll being adapted by its rotation toward the doctor blade to support a body of adhesive exclusively in said angle, adhesive-feeding means operable to add adhesive to said angle as the adhesive is used up, and a temperature-sensing device adjacent the surface of the applicator roll below the doctor blade operable to turn the heating element on and off to maintain the applicator roll at a constant predetermined optimum temperature.

4. An applicator comprising a roll having an external peripheral surface and containing interiorly thereof a heating element, a doctor blade supported with an edge in spaced parallel relation to the upwardly moving side of the roll with the surface of the doctor blade toward which the roll is turning making an angle with the surface, said roll being adapted by its rotation toward the doctor blade to support the body of adhesive exclusively in said angle, adhesive-feeding means operable to add adhesive to said angle as adhesive is used up, a temperature-sensing device adjacent the surface of the roll, an adhesive sensing device supported in said angle at a predetermined distance from the surface of the roll, said sensing devices comprising said temperature-sensing device and said adhesive sensing device being operable in conjunction to maintain the temperature of the applicator roll at a predetermined optimum level and in response to a temperature differential between the two to effect operation of said adhesive-feeding means to add adhesive to said angle between the doctor and the applicator roll, and means adjustably supporting the two sensing devices for adjustment relative to the surface of the applicator roll.

5. An applicator comprising a roll having a peripheral surface, a doctor blade supported with an edge in spaced parallel relation thereto at the upwardly moving side with the surface of the doctor blade toward which the roll is turning making an angle therewith, said roll being adapted by its rotation toward the doctor blade to support a body of adhesive exclusively in said angle, adhesive-feeding means operable to add adhesive to said angle as adhesive is used up, a thermocouple supported in said angle at a predetermined distance from the surface of the roll, said thermocouple being operable to changes in temperature to initiate and terminate operation of said adhesive-feeding means as the adhesive subsides therefrom on the one hand and makes contact therewith on the other hand.

6. An applicator comprising a roll having an exterior peripheral surface and an interior heating element, a doctor blade supported with an edge in spaced parallel relation thereto at the upwardly moving side with the surface of the doctor blade toward which the roll is turning making an angle therewith, said roll being adapted by its rotation toward the doctor blade to support a body of adhesive exclusively in said angle, adhesive-feeding means operable to add adhesive to said angle as the adhesive is used up, a temperature sensing device adjacent the surface of the roll which detects the temperature of the roll, an adhesive sensing device situated in said angle which detects the temperature of the adhesive supported therein, said sensing devices operating in conjunction to maintain the temperature of the applicator roll at a predetermined optimum level for the adhesive and in response to a temperature differential between the two to effect operation of the feeding means for transferring adhesive from a supply of adhesive to said angle between the doctor and the applicator roll.

References Cited

UNITED STATES PATENTS

| | | | |
|---|---|---|---|
| 2,357,845 | 9/1944 | Nordquist | 118—5 |
| 2,783,735 | 3/1957 | Paulsen | 118—410 |
| 2,989,422 | 6/1961 | Helbing | 118—7 XR |
| 3,115,433 | 12/1963 | Eolkin et al. | 118—7 XR |
| 3,237,593 | 3/1966 | Trotter | 118—7 |
| 3,255,727 | 6/1966 | Boothroyd | 118—7 |
| 3,348,526 | 10/1967 | Neubauer | 118—410 |

WALTER A. SCHEEL, Primary Examiner

ROBERT I. SMITH, Assistant Examiner

U.S. Cl. X.R.

118—7